INVENTOR
WILLIAM J. MILLER

BY George J. Crainger
ATTORNEY

Oct. 8, 1946.  W. J. MILLER  2,408,804
APPARATUS FOR MANUFACTURING JIGGERED POTTERYWARE
Original Filed Oct. 6, 1941  3 Sheets—Sheet 3
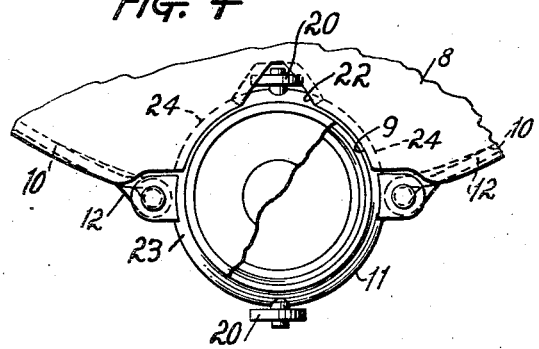
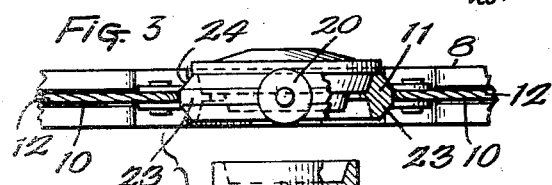
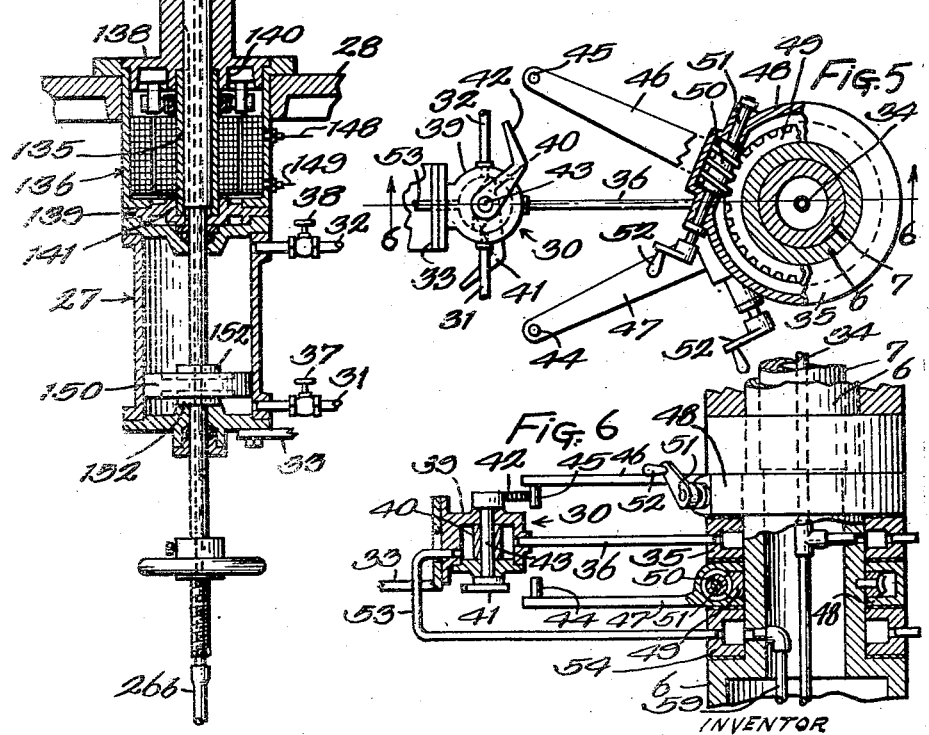
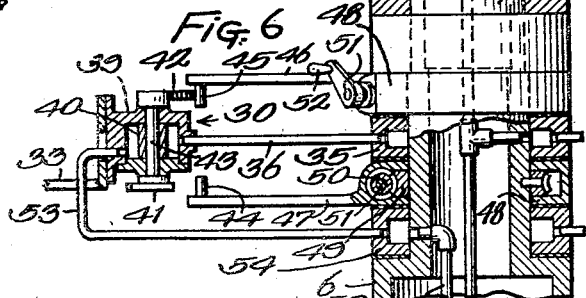
INVENTOR
William J. Miller
BY George J. Croninger
ATTORNEY Patented Oct. 8, 1946

2,408,804

UNITED STATES PATENT OFFICE 2,408,804

APPARATUS FOR MANUFACTURING JIGGERED POTTERYWARE

William J. Miller, Swissvale, Pa., assignor to Miller Pottery Engineering Company, Swissvale, Pittsburgh, Pa., a corporation of Pennsylvania Original application October 6, 1941, Serial No. 413,734. Divided and this application September 22, 1943, Serial No. 503,377

26 Claims. (Cl. 25—22)

This application is a division of my co-pending application Serial No. 413,734 filed October 6, 1941.

This invention relates to apparatus for manufacturing potteryware. It has to do with the production of jiggered ware, such as plates, cups and saucers and the like, from plastic clay on absorbent molds.

This application has to do particularly with apparatus for forming articles of potteryware by jiggering.

According to the present invention, the molds are moved in single file along a predetermined path and at locations spaced along said path, clay is fed to the molds and formed thereon, all whilst the molds are in continuous motion. The ware is thereafter dried and the molds returned for refilling.

One object of this invention is to provide a system and apparatus wherein productive operation is on a continuous and not intermittent scale, and to increase production capacity and speeds.

Another object is to provide for a wide range of production diversification whereby, due to this feature or the high speed feature, or both, the system will be highly adaptable to the high form diversity requirements of small potteries and the low form diversity high speed requirements of large potteries making a more standardized production.

Another object is to produce ware of excellent quality and appearance with a very low percentage of rejects or loss and in this connection, I have provided for ample periods of time to perform necessary operations properly and according to best practice.

Another object is to produce ware free from tool strains in the clay state and in this regard, I provide for an additional profiling stop, by means of which these strains are relieved.

Another object is to eliminate the need for skilled craftsman and to reduce manual intervention to a minimum. A further object is to simplify apparatus and procedure and reduce factory space requirements.

In the drawings:

Fig. 3 is an enlarged sectional detail of certain parts as seen in Fig. 2.

Fig. 4 is a plan view of parts seen in Fig. 3.

Fig. 5 is an enlarged detail plan section taken on the section line 5—5 of Fig. 2.

Fig. 6 is a sectional view taken on the section line 6—6 of Fig. 5.

Figure 1:
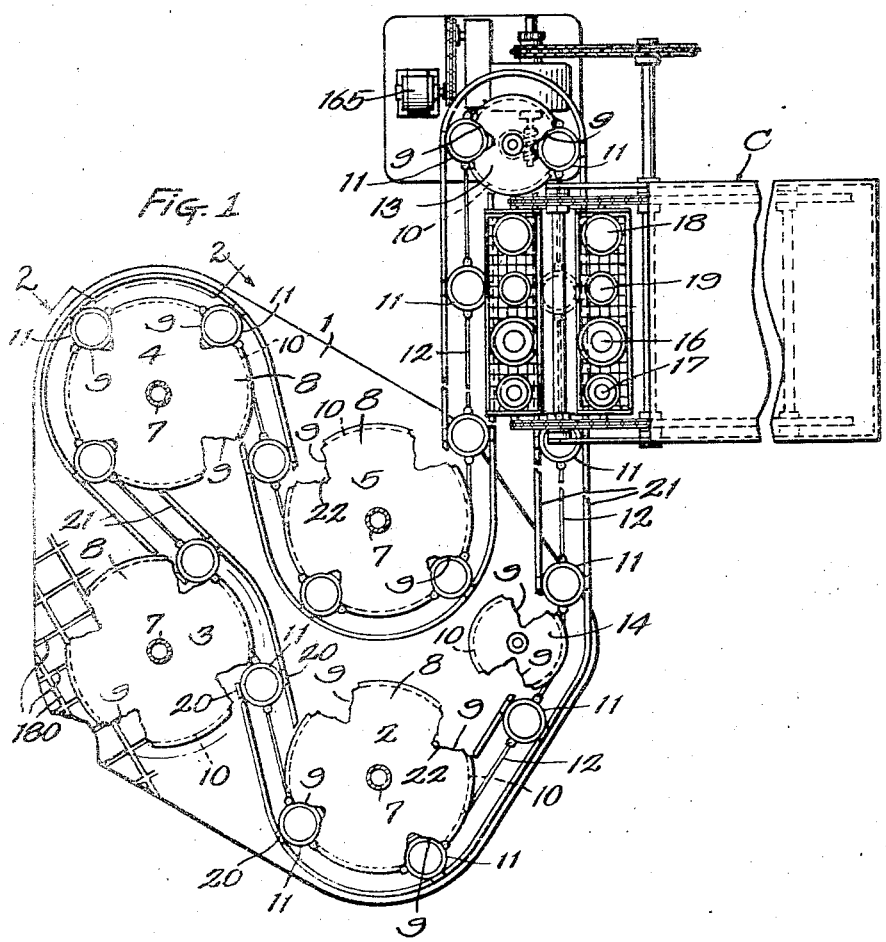
Fig. 1 is a diagrammatic illustration of the machine as seen in plan.
Figure 2:
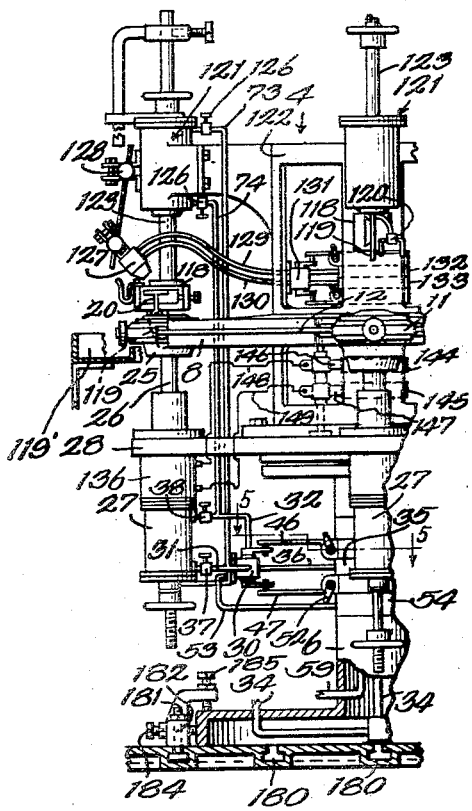
Fig. 2 is a fragmentary elevation of the initial jiggering organization of the machine, as viewed from the section line 2—2 of Fig. 1.

As diagrammatically seen in Fig. 1, the machinery has a base 1, upon which are mounted the machines for performing the various operations. Said machines include a mold charging machine 2, a preforming machine 3 and a jiggering machine 4 and if desired, an additional jiggering machine 5 for purposes to be later described. Each machine has a stationary pedestal 6, a hollow center shaft 7 and a rotatable table 8 having semi-circular peripheral sockets 9 and a peripheral groove 10 for receiving and supporting the mold supporting rings 11 and inter-connecting cable sections 12, which together, form an endless conveyor for the transportation of molds.

The conveyor which moves continuously is arranged in a horizontal plane and is also looped around a sprocket-like drive member 13 driven by an electric motor 155, and an idler 14 each provided with sockets 9 and peripheral cable grooves 10.

In regard to the location and arrangement of these machines, it has been stated hereinbefore that ample time is to be provided for properly performing the various operations mentioned. The optimum time interval for each operation will be that which in practice is indicated to be correct for each operation. Once these requirements are determined, the other factors, such as the amount of conveyor in association with each table, the diameter of the table, the speed of rotation thereof and the speed of travel of the conveyor can be determined.

For illustrative purposes, it will be assumed herein that the jiggering operation requires the longest interval of time to complete, as it normally does. The pressing or preforming operation takes the least time and the feeding operation requires about the same length of time as preforming. Thus, the machines are so arranged that for feeding, the conveyor is associated with the table of machine 2 for about 90° and for pressing or preforming the conveyor is associated with the table of machine 3 for about 45°.

If desired, machine 5 may be used to produce a finished surface on the ware leaving the matter of rough cutting to machine 4. Where it is used for finishing, I prefer to take a very light finishing cut to smooth and highly polish the ware surface. Machine 5 may also be used to normalize the plastic clay which develops strains whilst being profiled.

Obviously any desired number of machines may comprise the group depending on the number and nature of the operations to be performed and the practicability of sub-dividing operations.

The organized machines 4 or 5 are capable of making round jiggered pottery dinner ware, such as plates, cups and saucers and the like. Production may be diversified, if desired, and various types and forms of ware made in succession as illustrated by molds 16, 17, 18 and 19, representing both hollow ware and flat ware types. The maximum range of product diversification at any one time is herein illustrated, for example, as four and the molds therefore are arranged on the conveyor in sets of four, the molds of each set in the entire conveyor circuit corresponding to all other sets as to position, type, capacity, etc. A sample production set-up would be (1) a dinner plate, (2) cup, (3) saucer and (4) bowl and all the machinery would be adapted throughout to accommodate this production which would involve proper profile tools, chucks, mold seats, operational adjustment, etc. Changes in the production set-up may be made whenever desired, the amount and extent of machine re-adjustment and replacement of profile tools, chucks and other parts depending on the size of the molds and the type of ware involved.

With reference to the mold conveyor, the mold supports 11 have two rollers 20 adapted to ride upon track sections 21 and to be received freely within vertical notches 22, Fig. 4, of table 8 when the supports are associated with the sockets 9. The supports are held firmly level in vertical location in the sockets by the outwardly tapered peripheral tongue 23 within correlatively formed groove portions 24 in the side walls of sockets 9, Fig. 3, and when in such association, the mold registers with a mold lifter or chuck 25 therebelow and profiling equipment thereabove. The mold lifters and the profiling apparatus are herein shown as actuated by fluid motors, all substantially similar in construction and operation.

The mold chucks 25 are mounted on the top ends of vertical pistons 26 of piston and cylinder type fluid pressure-operated motors 27 secured to the rotatable tables 28 of the machines. Each piston rod preferably has a vacuum conduit 26a, connected to a vacuum hose 26b for intermittently vacuumizing the mold chucks 25 of the machines. Generally, the motors 27 are operated to raise and lower the molds in timed relation with the movement of the conveyor, by the motors 27 being alternately connected with a suitable source of fluid under pressure, by way of an automatically operated four-way control valve 30, Fig. 6, cooperating between conduits 31 and 32, leading from the ends of the cylinder and a supply conduit system leading to said source. The valves 30 are supported by brackets 33 on the cylinder housings.

The piping system of each jiggering machine includes a central stationary conduit 34 inside the pedestal, leading from a pump P to an interiorly grooved hollow ring-like distributor head 35 rotatable on the pedestal and connected to the valves 30, through pipes 36. Pipes 31 and 32 to the motors 27 have manually operated control valves 37 and 38 respectively to control the rate of flow of fluid to the motors 27 in regulating the speed of movement of the mold chucks to raised and lowered positions.

The valves 30 and the means for automatically operating same are described in my co-pending application, Ser. No. 304,540. As shown in Figs. 5 and 6, the valves 30 are of the oscillating four-way type, each having an upright cylindrical valve-casing 39 through which the conduits 31 and 32 are alternately connected to conduit 36 by an oscillating plug type valve member 40 which is oscillated by two cam levers 41 and 42 on the shaft 43, which during rotation of the table 28 are successively engaged by cam pins 44 and 45 on the ends, respectively of stationary cam arms 47 and 46 adjustably mounted on the pedestal 6 of each machine. Each arm has at its inner end, an internally grooved hub 48 within which is disposed a ring gear 49 secured on the pedestal and meshing with a worm 50 on a shaft 51 mounted in bearings of the hub. A hand-crank 52 on the shaft 51 is for rotating the worm to adjust the arms about the axis of the pedestal. The hubs 48 of the arms are arranged on opposite sides of the distributor-ring 35 to support same in vertical position on the pedestal.

Each valve 30 has a vent pipe 53, leading to a distributor 54 similar to distributor 35 and the outlet side of this distributor is connected by pipe 59 to a source of air under pressure.

In that the molds for producing the various articles only vary as to the shape and depth of the molding surfaces thereof, and are well-known in the art, it is considered sufficient to mention that the mold chucks for cooperating with same vary in depth of cavity and range of reciprocation accordingly in raising same out of the carriers.

With regard to the jiggering machine 4, to which the molds are conveyed successively after leaving the preforming machine 3, said machine has four jiggering units arranged respectively, above the sockets 9 thereof, with each unit including a vertically reciprocable tool holder 118 which is lowered when the mold chuck 25 therebelow raises a mold to bring the preformed work in or on the mold into cooperative engagement with the profile tool 119 slidably clamped in the holder. A trimmer 129 is fastened to the holder bracket. Scrap clay produced in profiling and trimming is thrown into stationary trough 119' encompassing a portion of the perimeter of the table 8.

Each profile is reciprocated by a fluid pressure operated cylinder and piston type motor 121 arranged thereabove and mounted on the side of a central upright cylindrical bracket 122 supported on table 8. The motor has a depending piston rod 123 at the bottom end of which the holder 118 is detachably secured. Motors 121 actuate the profile tools in timed relation with the movement of the mold chucks 25 by virtue of conduits 73 and 74 and valve 30. In each of the conduits 73 and 74 is a valve 126 to control the flow of fluid to the motors 121 in regulating the rate of action of the jiggering heads.

During the operation of each profile, the surface of the work is lubricated by means of a fine spray of water being directed thereon from a spray gun 127 arranged adjacent the profile and adjustably mounted on the housing of motor 121 by bracket 128.

Water and air, under pressure, are supplied to the spray gun from suitable sources by way of conduits 129 and 130 leading from the gun into ring-like water and air distributor heads 132 and 133 respectively, rotatably mounted on the central shaft 7 of the machine, and which are similar to the distributor head 35. For adjustably regulating the instant of application and length of application of spray from each gun, an automatically operated two line shut-off valve 131 is interposed in the conduits 129 and 130. With the exception of being of the two line shut off type, the valves 131 and means for operating same are substantially similar to the valves 30 and means for operating them associated with the chuck motors.

For rotating the chucks of the machine, the piston rod 26 upon which each chuck is mounted extends through and is in sliding key connection with the hollow shaft 135 of an electric motor 136 interposed between the chuck and the fluid pressure motor 137 thereof. The motors 136, Fig. 3, are suspended below table 28 with the fluid pressure motors secured onto their bottom ends, as seen in Fig. 3. Each electric motor 136 has top and bottom end walls 138 and 139 in which are bearings 140 and 141 supporting the ends of the motor shaft with the upper bearing continuing upward into a bearing portion 142 within which the piston 143 is supported.

The electric motors 136 are energized to rotate the chucks when raised, by each motor being connected with any suitable electric power lines, during a given portion of each revolution of the table 8b, by way of arcuate segmental contacts 144 and 145 on the shaft 8 of the device, cooperating with wiper contacts 146 and 147 arranged and connecting with the terminals of the motors through conductors 148 and 149.

To reduce the load on the electric motor 136 to a minimum, the piston 26 of the fluid pressure motors 27 therebelow are arranged on the piston rods of the motors to be relatively rotatable with respect thereto, wherein there are two collars 152 arranged on the rods between which the pistons are held in position.

It has been stated that the entire jiggering operation may be performed by machine 4. If desired, however, an additional machine 5, similar in all respects to machine 4, may be included in the machinery group. The primary function of this machine would be to complete the work started by the first jigger, if there is not ample time for the first jigger so to do. This depends to a great extent on the nature of the ware being produced and the speed of travel of the conveyor. It will be obvious that the jiggering operation could be divided between several more machines rather than just two illustrated, however, the idea to be conveyed is that ample jiggering time may be obtained, if necessary, by the use of more than one machine.

The jigger includes a turntable and several profiles each adapted to successively register with molds on the conveyor and by relative rotation of the tools and work the jiggering operation is performed and the piece completed, all whilst the conveyor, tools, turntable and molds are in continuous motion. As before stated, the operation may be divided between plural tables. After leaving the jigger or jiggers, the warebearing molds (the ware being completed insofar as plastic tooling is concerned) are transported through a dryer either on the machine conveyor or by means of an independent dryer conveyor to which they are transferred by hand. When the ware has dried, it is stripped from the molds and the molds all returned to the machines for refilling.

Furthermore, a unit comprising either one or both jiggers and the mold conveyor could be operated for the purpose of profiling pottery ware with the molds being charged by hand or by other suitable means. By the foregoing, I desire to point out that various sub-combinations of the whole are possible and all comprehended within the spirit and scope of this invention.

With regard to Fig. 1, the base of the machine is criss-crossed with T slots 180 in which are received the heads of inverted bolts 181 extending upwardly through holes in base clamps 182 and being secured thereto by nuts 183. The clamps have horizontal adjustment screws 184 for making minor adjustment in the location of the machines and vertical hold-down screws 185 for clamping the machine base to the floor. Any major adjustment in the location of either jigger machine can be quickly and easily accomplished by removing the clamps 182 and shifting the machine to the desired location.

By virtue of the foregoing invention, it will be observed that I have provided a method or system wherein a mold is carried with sustained forward movement in one path and a fabricating implement is carried with sustained forward movement in another, and different, orbital path and in a portion of their respective paths the mold and implement are brought into registration and fabricating cooperation. The molds in this case are transported in a tortuous path and in the curved portions of the path are located the fabricating machines on adjustable bases. The length of the curved portions of the path, or rather the amount of conveyor in association with the table of a particular machine determines the time available for the performance of an operation on the mold by the fabricating implements of the machine. Obviously, variations in the time of the fabrication can be obtained by varying the position of the machines relative to the conveyor. The instant of initiation of the fabricating operation, the duration and endpoint of such operation is of course controlled by and variable by means of the valves in the fluid system.

If desired, the jiggering machine 5 may be included as a permanent member of the machinery group and operated in a certain manner in conjunction with machine 4. Machine 4 may be adjusted to roughly finish the ware, leaving the work of polishing to machine 5. Also, relative rotation between the tool and work may be the reverse, on machine 5, of that on machine 4. In such event, the beveled edge of the profiles of machine 5 would slope in the opposite direction to that of the profiles of machine 4. By reversing the relative rotation of the work and tool, the strains introduced by the first profile are removed and any surface fissures or cracks closed up. It will be understood that while I have shown the profile as stationary relative to the mold, the profile may be rotated with the mold remaining stationary.

Although the conveyors 11—12 and conveyor 15 may be independently driven, they are, as shown, driven in synchronism by a common prime mover in the form of an electric motor 165. The driving wheel 13 of the conveyor 12 is secured on a vertical shaft 166 on which is a worm gear 167 meshing with a worm pinion 168 on the driving shaft 169 of a worm and gear type speed reducer 170 which is in driven connection with the motor 165 through an adjustable, conical pulley and belt type speed reducer 171 and a sprocket wheel and chain connection 172 cooperating between the shaft of the motor and the driven shaft of the belt type speed reducer. The conveyor 15 is driven by the motor 165 by way of the gear type speed reducer 170 on whose shaft 169 is a sprocket wheel 175 connected by chain 176 to a sprocket 176' on one of the upper shafts of the conveyor.

I claim:

1. In combination, potteryware jiggering apparatus having a turntable associated therewith rotatable about a vertical axis, jiggering implements above said table, and rotatable therewith about said axis, endless flexible mold conveying means looped around said turntable, pottery molds mounted on said conveying means to be carried thereby to said turntable and transported about said axis in register with said jiggering implements thereabove, means for relatively moving said molds and jiggering implements when in register to perform jiggering operations and means operable to continuously drive said conveying means and turntable.

2. Potteryware jiggering apparatus which comprises, a horizontal support provided with spaced recesses therethrough for receiving mold supports, means for continuously rotating said support, a jiggering tool above and in register with said recesses and continuously rotatable therewith, a plurality of mold carrying members and an endless, continuously traveling conveyor to which said members are attached and carried horizontally into interfitting relation with said recesses whereby successive molds are indexed with successive profiles to have the ware thereon jiggered.

3. Potteryware jiggering apparatus which comprises, a horizontal support provided with spaced recesses therethrough for receiving mold supports, means for rotating said support, means movable with and above and in register with said recesses and rotatable therewith for jiggering clay on molds therebelow, a plurality of mold carrying members, and means for moving said members horizontally into interfitting relation with said recesses whereby successive molds are indexed with successive jiggering means to have the clay thereon jiggered.

4. Potteryware jiggering apparatus which comprises, a horizontal support provided with spaced recesses therethrough for receiving mold supports, means for rotating said support, means movable with and mounted above and in register with said recesses for jiggering clay on molds therebelow, a plurality of mold carrying members, means for moving said members horizontally into seated relation with said recesses to be rotated therewith and means for causing relative movement between said molds and jiggering means when in register to jigger the clay on said molds.

5. Potteryware jiggering apparatus which comprises, a horizontal support provided with spaced recesses therethrough for receiving mold supports, means for rotating said support, means movable with and mounted above and in register with said recesses for jiggering clay on molds therebelow, a plurality of mold carrying members, means for moving said members horizontally into seated relation with said recesses to be rotated therewith, means for causing relative axial movement between said molds and jiggering means and means for relatively rotating said molds and jiggering means when in register.

6. Potteryware jiggering apparatus which comprises, a horizontal support provided with spaced recesses therethrough for receiving mold supports, means for rotating said support, means movable with and mounted above and in register with said recesses for jiggering clay on molds therebelow, a plurality of mold carrying members, means for moving said members horizontally into seated relation with said recesses to be rotated therewith and track means adjacent said last named means for guiding said mold supports into said recesses.

7. Potteryware jiggering apparatus which comprises, a horizontal support provided with spaced recesses therethrough for receiving mold supports, means for rotating said support, means movable with and mounted above and in register with said recesses for jiggering clay on molds therebelow, a plurality of mold carrying members, means for moving said members horizontally into seated relation with said recesses and stationary means beside said last named means and adjacent said horizontal support for undersupporting said mold carrying members when in associated relation with said recesses.

8. Potteryware jiggering apparatus which comprises, a rotatable, horizontal table provided with circumferentially spaced recesses in the perimeter thereof for receiving mold supports, means movable with and mounted above and in register with said recesses for jiggering clay on molds therebelow, an endless mold carrying member in driving association with said table, mold supports carried by said member to be received in said recesses and carried therewith and means for relatively moving said jiggering means and said molds when in register to effect a jiggering operation.

9. Potteryware jiggering apparatus which comprises, a horizontal support provided with spaced recesses, a jigger tool mounted above and in register with each recess, and an endless mold conveyor having mold carrying members attached thereto formed and positioned to mesh with said recesses.

10. Apparatus for jiggering potteryware which comprises, a continuously moving support for molds for carrying them through a jiggering zone, a tool for jiggering potteryware in said zone movable therewith, and a continuously traveling endless mold conveyor formed and positioned for depositing molds on said moving support to have the clay carried thereby acted upon by said tool and for removing molds with completed ware therefrom whilst said support and mold conveyor are in motion.

11. Apparatus for jiggering potteryware which comprises, a continuously moving support for molds for carrying them through a jiggering zone, a jigger tool mounted above said support and movable therewith, a continuously traveling endless mold conveyor formed and positioned for depositing molds on said moving support to have the clay carried thereby acted upon by said tool and for removing molds with completed ware therefrom whilst said support and mold conveyor are in motion and means for relatively rotating said mold and jigger tool when in associated relation.

12. Potteryware jiggering apparatus which comprises, a horizontal support provided with spaced recesses, a jigger tool mounted above and in register with each recess, an endless mold conveyor having mold carrying members attached thereto formed and positioned to mesh with said recesses, means for moving said conveyor and support to transport molds successively into register with said tool and means for relatively moving said tool and successive molds when in register to effect jiggering operations.

13. Potteryware jiggering apparatus comprising a continuously rotating table having recesses for receiving mold supports, an endless conveyor associated therewith having mold supports to be received in said recesses and transported for a predetermined distance therewith, a jigger tool above, in register, and movable with each recess, means for moving each jigger tool relative to molds therebelow to effect a jiggering operation and means for lubricating the clay incident to jiggering.

14. Potteryware jiggering apparatus comprising a continuously rotating table having recesses for receiving mold supports, an endless conveyor associated therewith having mold supports to be received in said recesses and transported for a predetermined distance therewith, a jigger tool above each recess, a mold lifter below each recess, and means for relatively moving said tool and mold lifter to effect a jiggering operation.

15. The combination with a pair of spaced, continuously rotatable tables provided with circumferentially spaced recesses therethrough of jigger tools mounted to continuously move with said recesses and positioned above and in register therewith, an endless conveyor associated with said tables and mold supports attached to said conveyor to be delivered thereby to said recesses and removed thereby from said recesses whereby molds are deposited on said tables for cooperation with said jigger tools.

16. In apparatus for jiggering pottery ware, a rotary table having a plurality of profiles associated therewith, a second rotary table having a plurality of profiles associated therewith, mold conveying means associated with both tables, molds disposed thereon, means for driving said conveying means and said tables to bring the profiles successively into registry with the molds, means for effecting relative rotation between the profiles and molds when in cooperation and whilst the conveying means and tables are in continuous motion, the relative rotation between molds and profiles being reversed as between tables.

17. Apparatus for manufacturing dinnerware and the like comprising a continuously moving support for carrying mold carriers through a fabricating zone, means for jiggering ware in said zone, and a continuously traveling, endless mold conveyor having mold carriers formed and positioned for meshing with said support.

18. Apparatus for manufacturing dinnerware and the like comprising a rotatable support for carrying mold carriers through a fabricating zone, means for jiggering ware in said zone and a traveling, endless mold conveyor having mold carriers formed and positioned for meshing with said support.

19. Apparatus for manufacturing dinnerware and the like comprising a rotatable support for carrying mold carriers through a fabricating zone, said support having peripheral recesses for receiving mold carriers, means for jiggering ware in said zone, and a traveling endless mold conveyor having mold carriers formed and positioned for meshing with the recesses of said support.

20. Apparatus for manufacturing dinnerware and the like comprising a support for carrying mold carriers in a curved path through a fabricating zone, a plurality of jiggering members movable in a path concentric with the axis of the curved path for forming ware on molds carried by the carrier, and an endless, flexible conveyor arranged to travel around said support to carry molds to the fabricating zone and remove them therefrom.

21. Apparatus for manufacturing dinnerware and the like comprising a support for carrying mold carriers in a curved path through a fabricating zone, said support including a stationary track, a jigger tool, means for carrying said tool in a path concentric with the axis of said mold support into and out of register with molds therebelow, an endless conveyor arranged to travel around said support to carry molds to the fabricating zone and remove them therefrom, jigger molds carried by said conveyor and means for moving said jigger tool and a mold relative to one another when in register to perform a jiggering operation.

22. Apparatus for manufacturing dinnerware and the like comprising a support for carrying mold carriers in a curved path through a fabricating zone, said support including a stationary track and a rotatable member having recesses formed for receiving mold carriers, a jigger tool, means for carrying said tool in a path concentric with the axis of said mold support into and out of register with molds therebelow, an endless conveyor arranged to travel around said support having mold carriers attached thereto, jigger molds carried by said carriers and means for moving said jigger tool and a mold relative to one another when in register to perform a jiggering operation.

23. Apparatus for manufacturing dinnerware and the like comprising a support for carrying mold carriers in a curved path through a fabricating zone, said support including a stationary track and a rotatable member having recesses formed for receiving mold carriers, a jigger tool, means for carrying said tool in a path concentric with the axis of said mold support into and out of register with molds therebelow, an endless conveyor arranged to travel around said support having mold carriers provided with rollable elements attached thereto, jigger molds carried by said carriers and means for moving said jigger tool and a mold relative to one another when in register to perform a jiggering operation.

24. Apparatus for manufacturing dinnerware and the like comprising a support for carrying molds through a fabricating zone, a jigger tool in said fabricating zone, means for carrying said tool in a circular path in said fabricating zone into and out of regitser with a mold therebelow and a continuously moving mold conveyor formed and positioned for transporting molds containing clay to said support and for carrying them away therefrom after the material therein has been jiggered.

25. Apparatus for manufacturing dinnerware and the like comprising, a support for carrying molds in a curved path in a fabricating zone, a profile tool above said support mounted to rotate in a concentric circular path into and out of register with a mold therebelow and a mold conveyor for transporting molds to said support to have clay thereon jiggered by the profile and for carrying molds with jiggered ware thereon away from the fabricating zone.

26. Apparatus for manufacturing dinnerware and the like comprising, a support for carrying molds in a curved path in a fabricating zone including a stationary curved track and a member movable in a path concentric therewith, a profile tool above said support mounted to rotate in a circular path concentric with the axis of the curved track into and out of register with a mold therebelow and a mold conveyor for transporting molds to said support to have clay thereon jiggered by the profile and for carrying molds with jiggered ware thereon away from the fabricating zone.

WILLIAM J. MILLER.